Aug. 11, 1931.   M. J. MILMOE   1,818,498
WRAPPING AND SEALING MACHINE
Original Filed Feb. 25, 1927   13 Sheets-Sheet 6
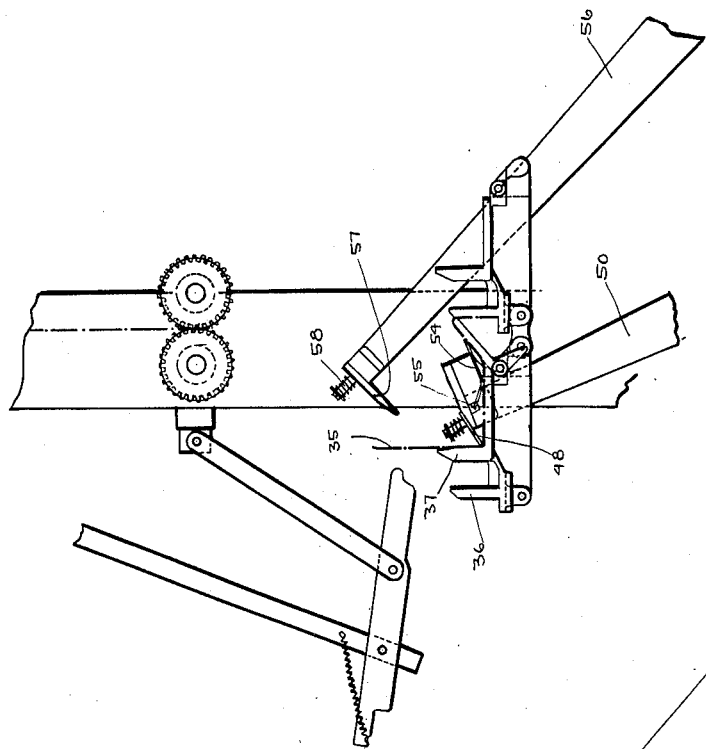
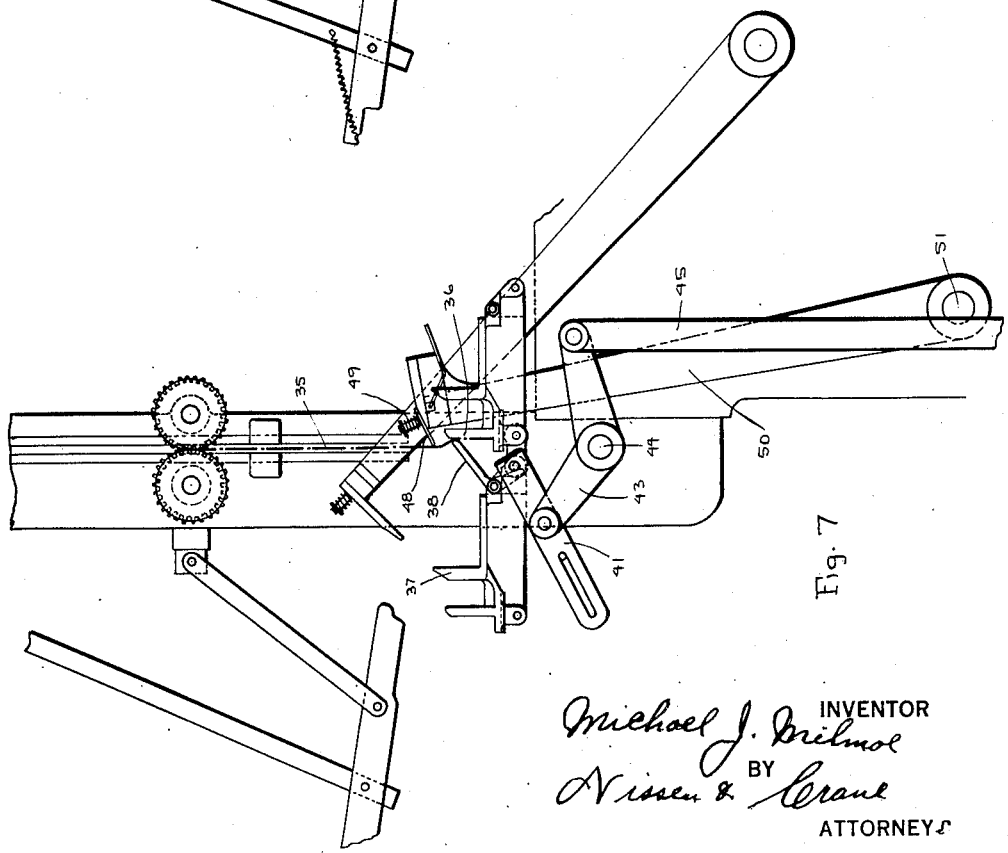

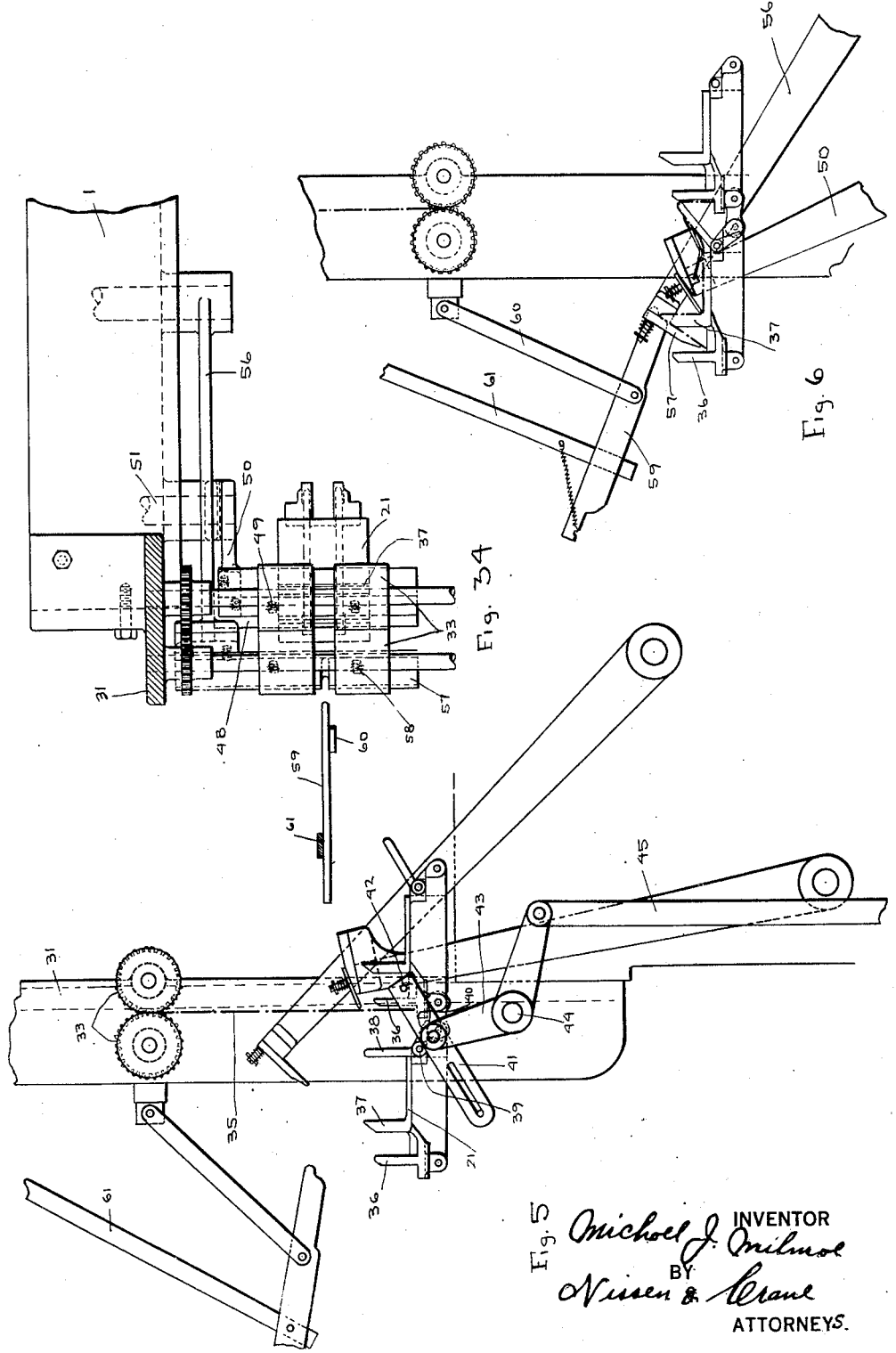

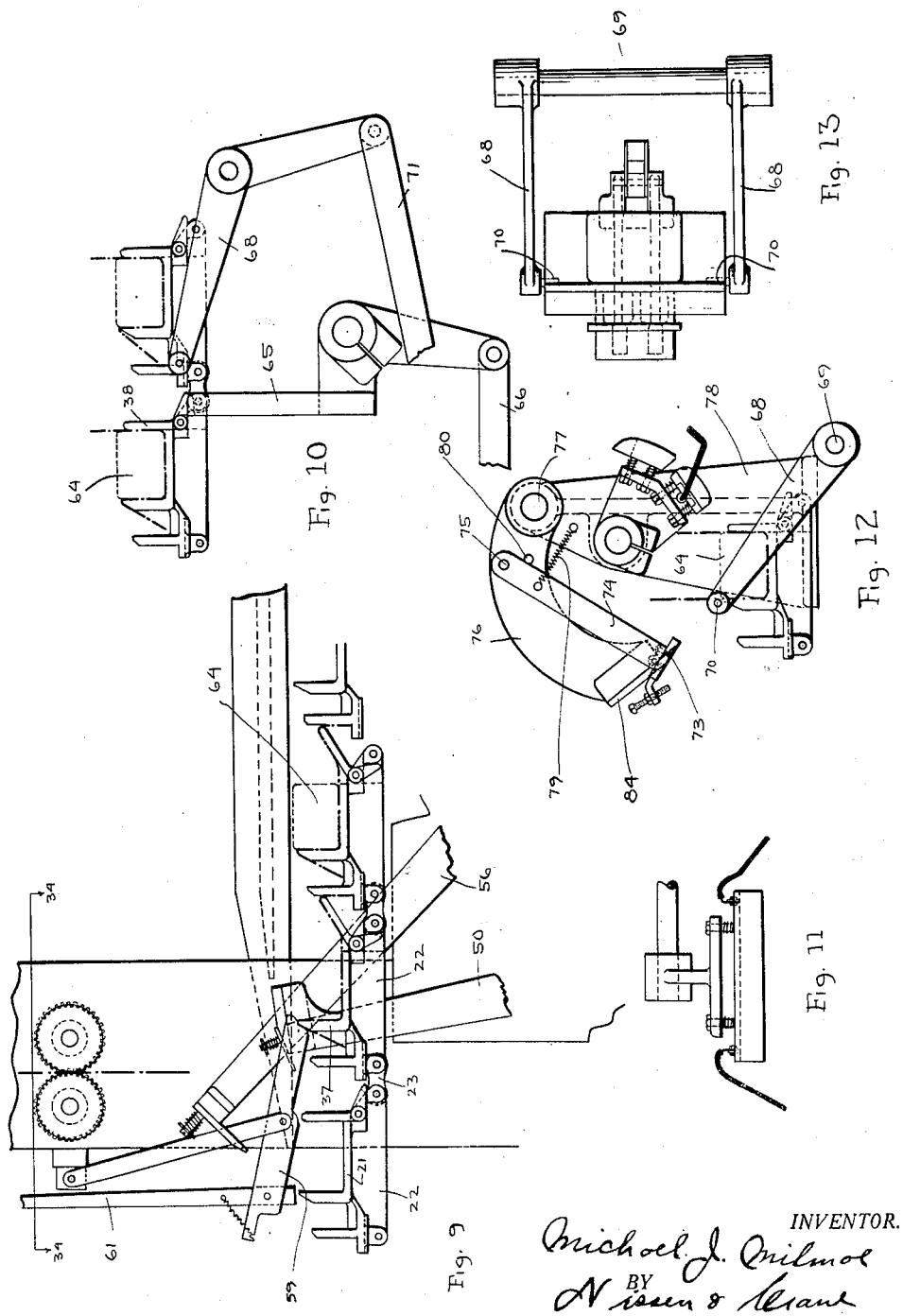

Aug. 11, 1931.          M. J. MILMOE                1,818,498
              WRAPPING AND SEALING MACHINE
        Original Filed Feb. 25, 1927      13 Sheets-Sheet 8
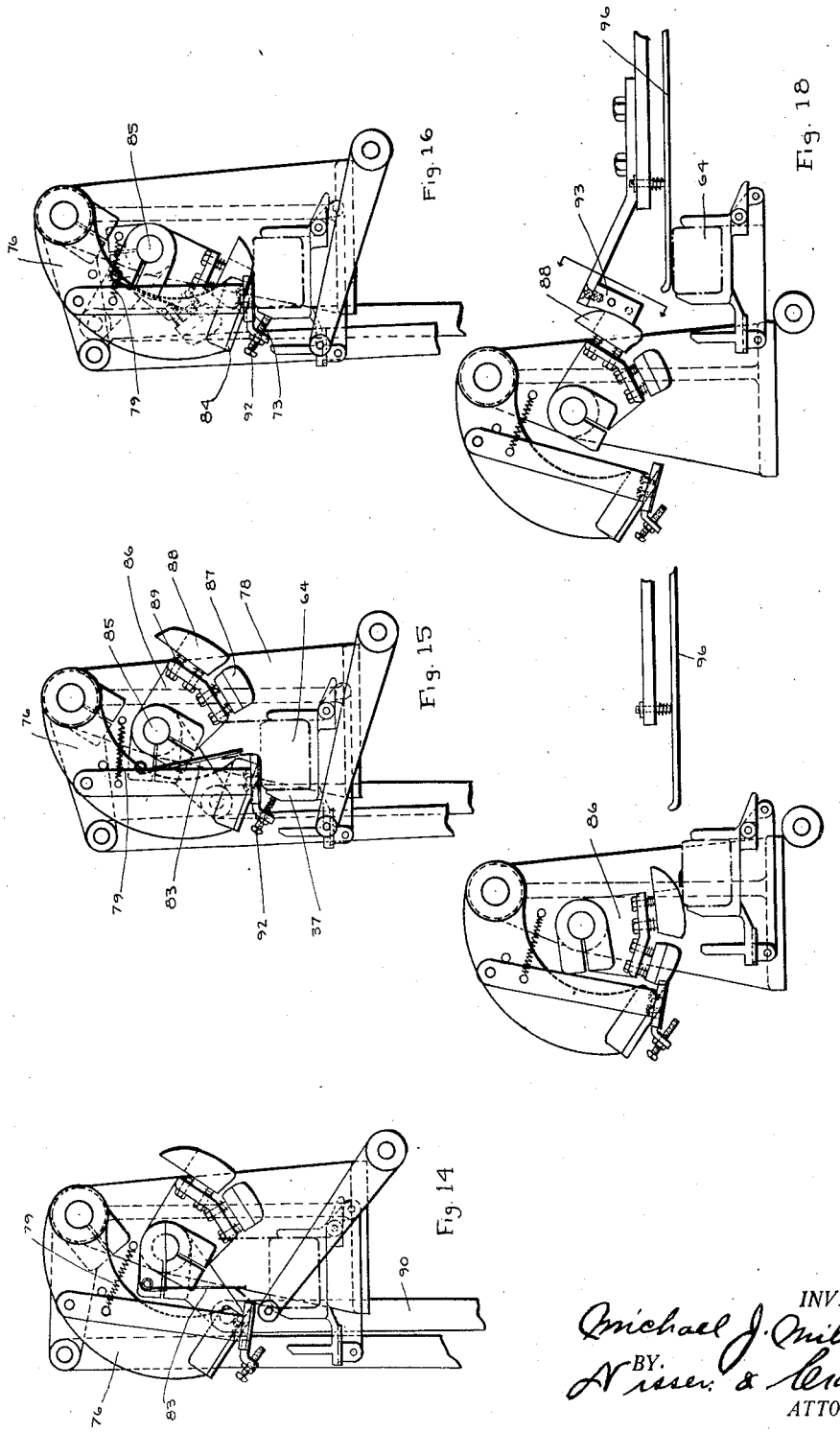
INVENTOR.
Michael J. Milmoe
BY
Nisser & Crane
ATTORNEYS.

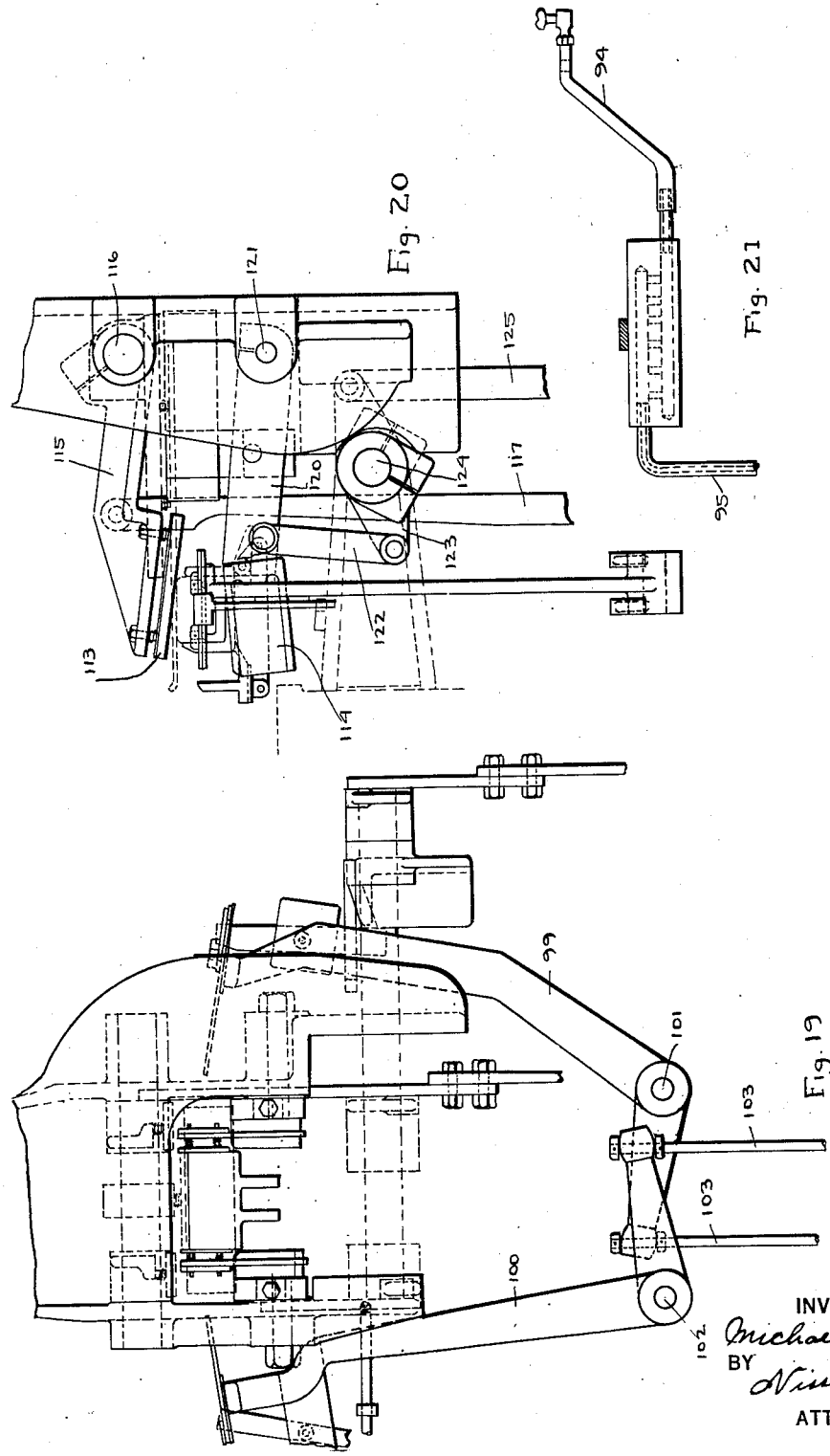

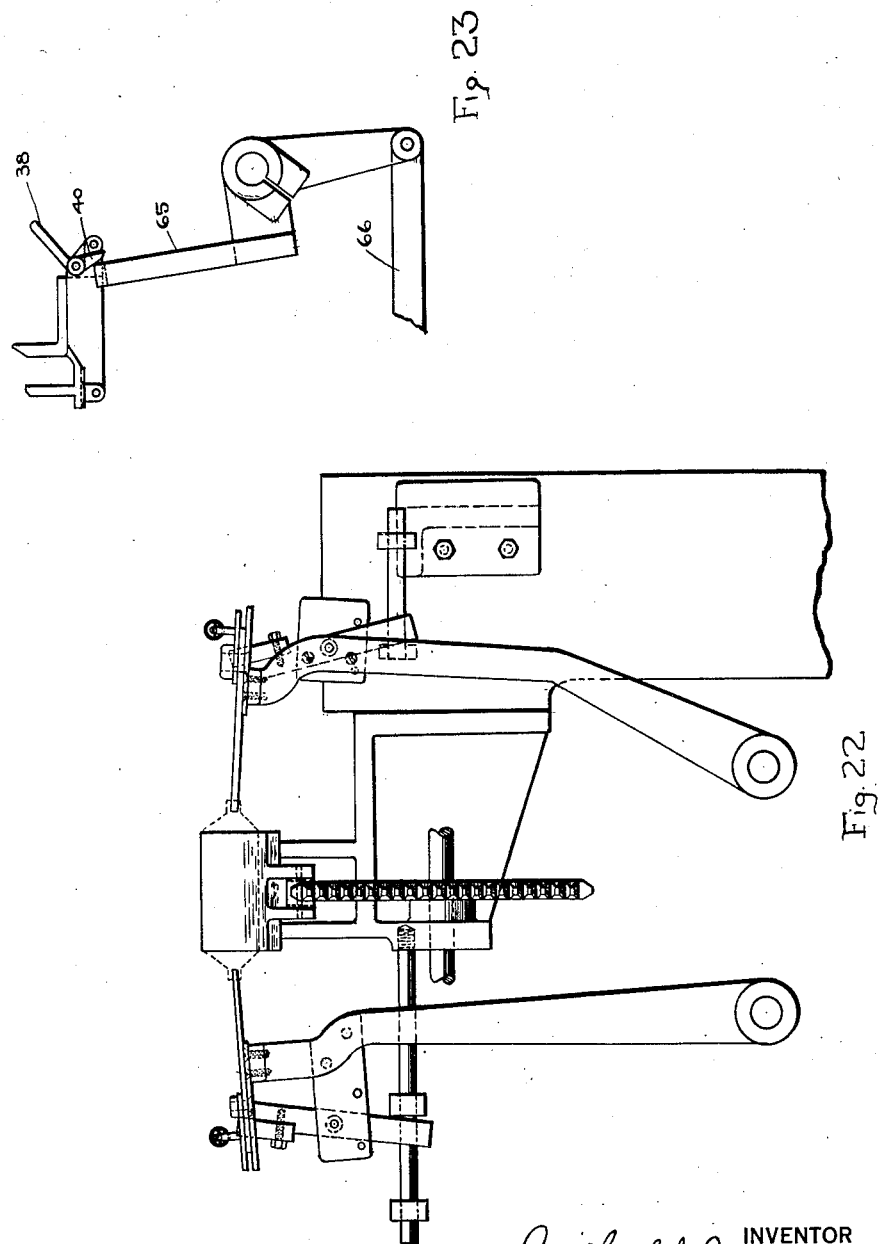
Aug. 11, 1931.  M. J. MILMOE  1,818,498
WRAPPING AND SEALING MACHINE
Original Filed Feb. 25, 1927  13 Sheets-Sheet 10

Aug. 11, 1931.  M. J. MILMOE  1,818,498
WRAPPING AND SEALING MACHINE
Original Filed Feb. 25, 1927    13 Sheets-Sheet 11
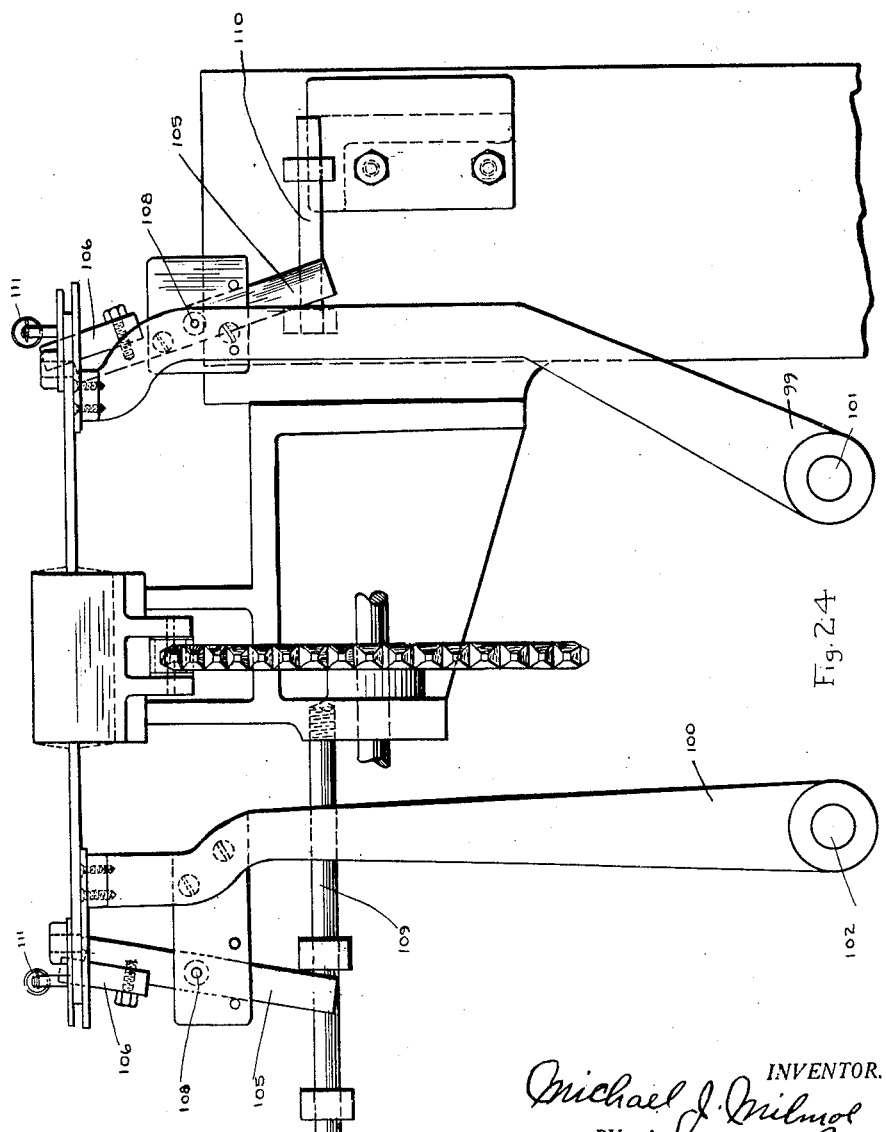

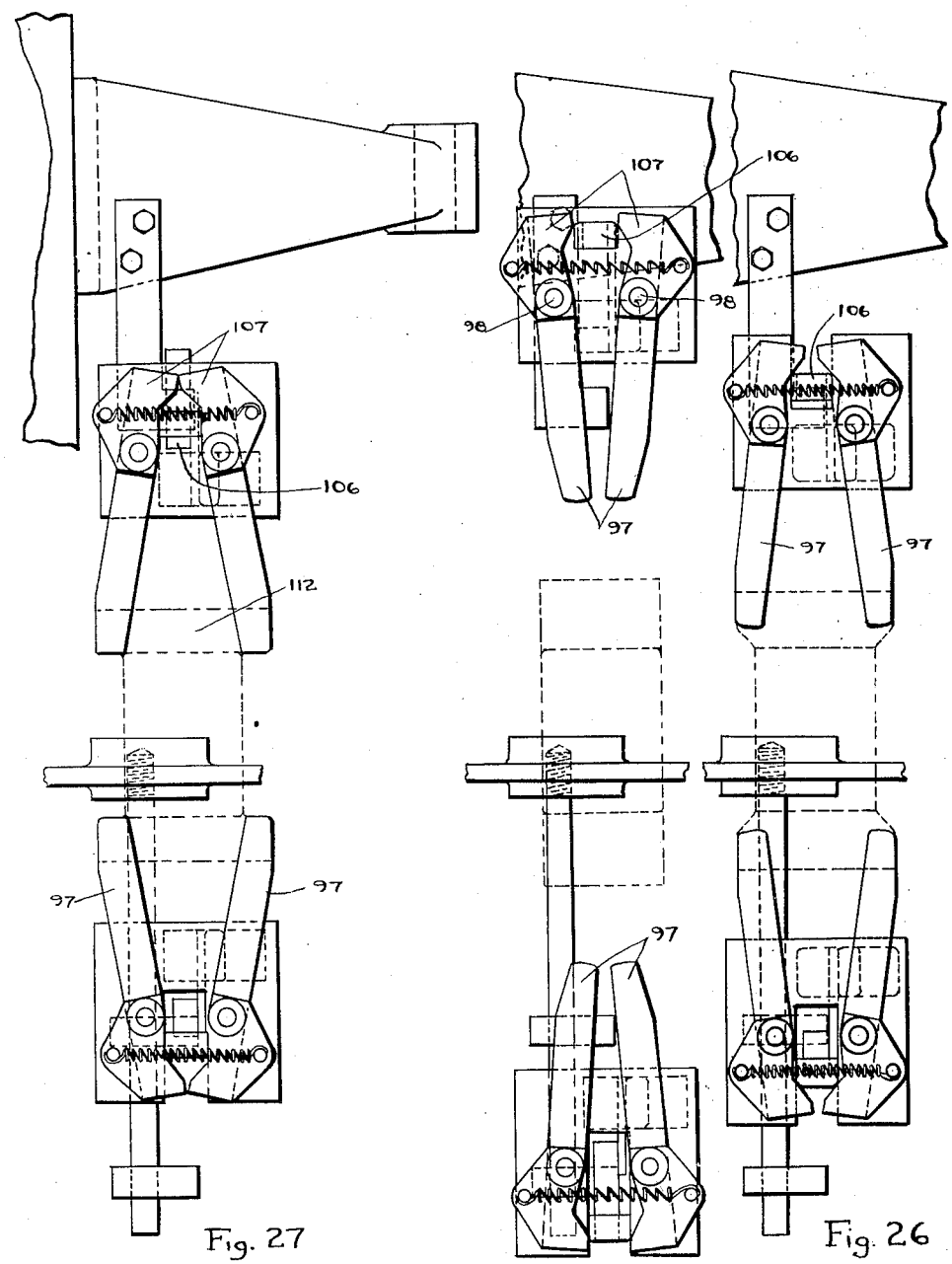

Aug. 11, 1931.   M. J. MILMOE   1,818,498
WRAPPING AND SEALING MACHINE
Original Filed Feb. 25, 1927    13 Sheets-Sheet 13
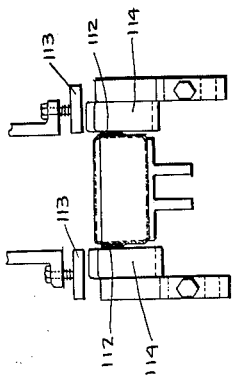
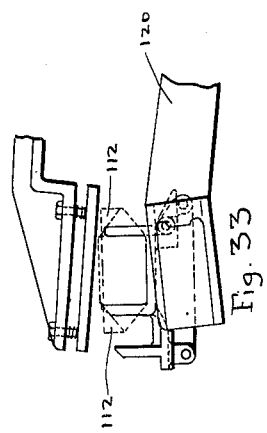
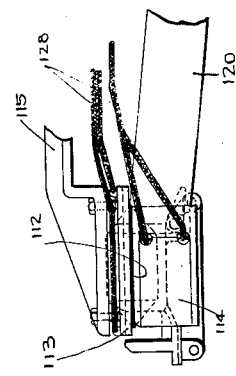
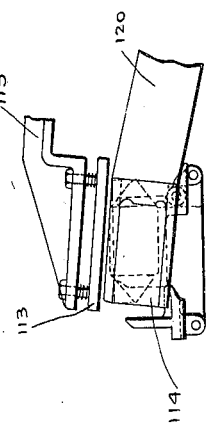
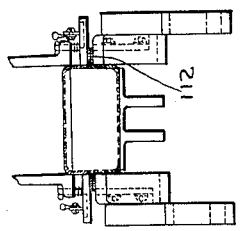
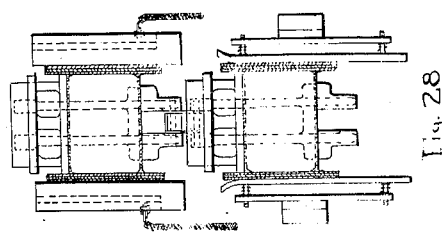
INVENTOR.
Michael J. Milmoe
BY Nissen & Crane
ATTORNEYS.

Patented Aug. 11, 1931

1,818,498

UNITED STATES PATENT OFFICE

MICHAEL J. MILMOE, OF CHICAGO, ILLINOIS, ASSIGNOR TO F. B. REDINGTON CO., OF CHICAGO, ILLINOIS, A CORPORATION OF ILLINOIS

WRAPPING AND SEALING MACHINE

Application filed February 25, 1927, Serial No. 170,853. Renewed December 12, 1930.

This invention relates to machines for wrapping and sealing articles and has for its object the provision of a machine of the class named which shall be of improved construction and operation and which will wrap and heat seal a package without injury to the goods contained within the package. Other objects will appear from the following description.

The invention is exemplified in the combination and arrangement of parts shown in the accompanying drawings and described in the following specification, and it is more particularly pointed out in the appended claims.

In the drawings:—

Figs. 5, 6, 7, 8 and 9 are fragmentary elevations illustrating steps in the wrapping process performed by the invention;

Fig. 10 is a fragmentary elevation of a portion of the transporting conveyer with associated parts;

Fig. 11 is an elevation of one of the heat sealers;

Fig. 12 is an elevation of the sealing apparatus for a portion of the wrapper;

Fig. 13 is fragmentary top plan view of a portion of the wrapping mechanism;

Figs. 14, 15, 16, 17 and 18 are views similar to Fig. 12 but showing the sealing mechanism in different positions;

Fig. 19 is an elevation of a portion of the wrapper folding mechanism;

Fig. 20 is an elevation of a portion of the sealing mechanism;

Fig. 21 is an elevation of a cooling device;

Fig. 22 is a view of a portion of the mechanism shown in Fig. 19, in a different position;

Fig. 23 is a fragmentary elevation of a portion of the mechanism shown in Fig. 10, in a different position;

Fig. 24 is a view similar to Fig. 22, showing the parts in another position;

Figs. 25, 26 and 27 are top plan views of the mechanism shown in Figs. 22 and 24, the parts being in different positions in the different figures;

Fig. 28 is a top plan view of a portion of the wrapping mechanism with the wrapper in section;

Fig. 29 is an elevation of a portion of the heat sealing mechanism;

Fig. 30 is a view looking toward the right in Fig. 29;

Fig. 31 is a view similar to Fig. 29, with the parts in a different position;

Fig. 32 is a fragmentary side elevation of the parts shown in Fig. 31;

Fig. 33 is a view similar to Fig. 32 with the parts in a different position;

Fig. 34 is a section on line 34—34 of Fig. 9.

Figure 1:
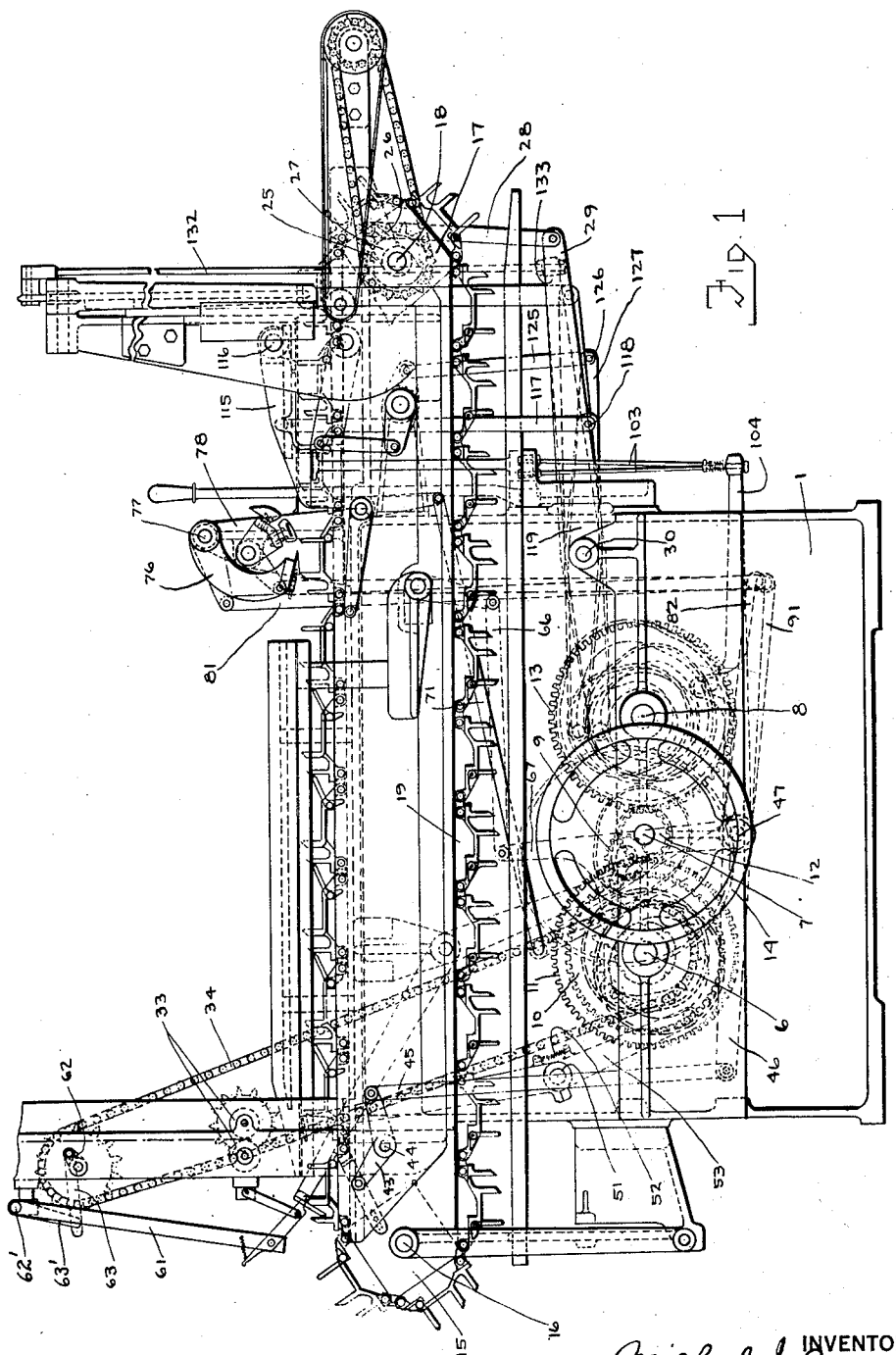
Fig. 1 is a side elevation of a machine embodying the present invention.

The invention is illustrated as applied to a machine for wrapping packages of minced meat, or similar material, which requires an air-tight package for preserving the material. A waxed or paraffin paper is used for wrapping the minced meat and the wrapper is sealed at all portions thereof so that no passage is left for the entrance of air. In order to produce an air-tight package, the edges of the wrapper are caused to project from the article and heat sealed together. Provision is made for applying the heat to the edges of the wrapper while the edges project away from the article in order that the material of the package may not be injured by the heat from the sealing devices.

Referring more particularly to the drawings, the numeral 1 designates a supporting frame having a longitudinally extending web member 2 and suitable brackets for supporting the various equipment as will be further described hereinafter. A main drive pulley 3 is mounted on a shaft 4 journaled in the frame 1 and controlled by a clutch lever 5. Cam shafts 6, 7 and 8 are journaled in the frame 1 and extend transversely thereof. The drive shaft 4 is provided with a pinion 9 which meshes with a gear 10 on the cam shaft 6. The shaft 6 is provided with a gear 11 at the side of the machine opposite the gear 10 and the gear 11 meshes with a pinion 12 on the cam shaft 7. The pinion 12, in turn, meshes with a gear 13 on the cam shaft 8. A hand wheel 14 is secured to the shaft 7 so that the machine may be driven by hand for purposes of observation, adjustment or other manipulation.

Figure 4:
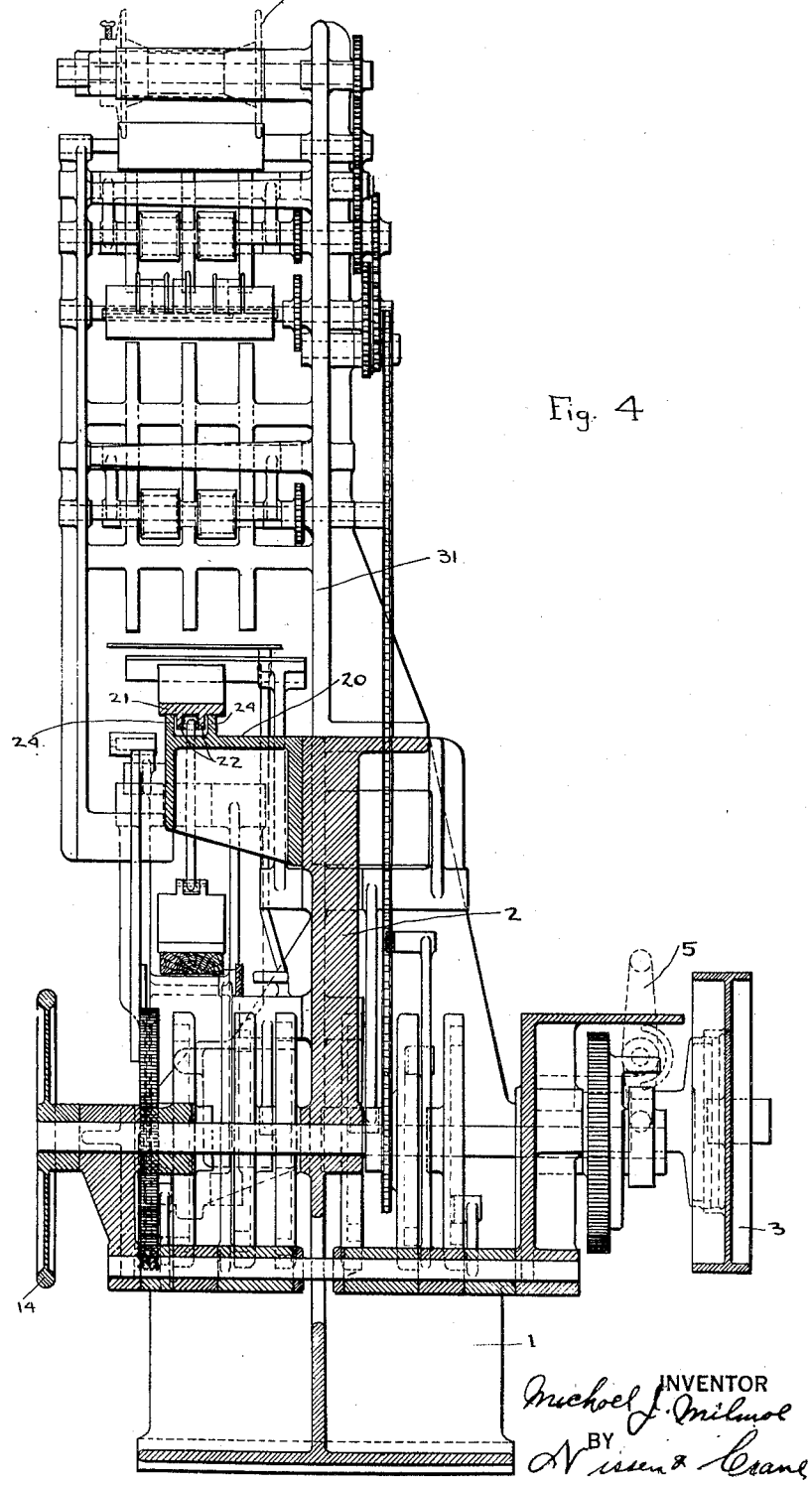
Fig. 4 is a transverse vertical section substantialy on line 4—4 of Fig. 3.

A sprocket wheel 15 is mounted on a shaft 16 at the front end of the frame 1, the sprocket wheel being rectangular in contour and having sprocket teeth projecting radially from each corner thereof. A similar sprocket wheel 17 is secured to a shaft 18 at the rear end of the machine frame. A conveyer chain 19 extends about the sprockets 15 and 17 and the upper run of the conveyer is supported by a shelf 20 (Fig. 4) which is mounted on the main web 2 of the frame 1. The conveyer chain 19 is made up of buckets, each of which is provided with a web or plate 21 having downwardly extending spaced flanges 22. Links 23 connect the flanges 22 of adjacent buckets and the links 23 are provided with openings for engaging the teeth of the sprockets 15 and 17. The flanges 22 travel between supporting guides 24 on the plate 21, as shown in Fig. 4, and also engage the flat edges of the sprocket wheels as the buckets pass about the sprockets. The web or plate 21, as clearly shown in the drawings, has a central portion which is raised above the end portions thereof. The conveyer chain is intermittently driven by means of a four-toothed ratchet 25 fast to the shaft 18 and operated by a pawl 26 journaled on an arm 27 which is pivotally mounted on the shaft 18. The arm 27 is oscillated by a link 28 connected to a lever 29. The lever 29 is mounted on a pivot shaft 30 and oscillated by a cam on the shaft 8. The conveyer chain will be intermittently moved forwardly by amounts equal to the length of the bucket and will remain stationary in each position for a period of time after each forward movement.

Projecting upwardly from the front end of the web 2 is a frame 31 having a reel 32 thereon for supporting a roll of paper from which wrappers are formed. Suitable mechanism may be mounted on the frame 31 for severing wrappers from the roll on the reel 32 and feeding them downwardly at intervals between rollers 33 located above the upper run of the conveyer chain 19. The paper feeding mechanism is driven by a sprocket chain 34 which passes over a sprocket on the shaft 6 so that the wrappers will be fed downwardly in timed relation to the movement of the conveyer chain. One wrapper will be discharged from the rollers 33 for each forward movement of the conveyer chain. Fig. 5 shows the position of the wrapper as it is discharged downwardly onto the conveyer chain. The wrapper is designated by the numeral 35. Each of the conveyer buckets, as shown in Fig. 5, is provided with two upstanding flanges 36 and 37 fixed to the plate 21 and also a third flange 38 pivoted at 39 adjacent the front edge of the bucket. The center of gravity of the flange 38 will be in the rear of the pivot 39 when the parts are in the position shown in Fig. 5 and the rear ends of the flange 38 will rest against the front edge of the upper portion of the plate 21 to limit the backward movement of the pivoted flange. It will be seen from Fig. 5 that the wrapper 35 is fed downwardly directly in the rear of the flange 36 on one of the buckets. The pivoted flange 38 is provided with a forwardly extending tail piece 40 and a slide bar 41 is arranged at one side of the path of the conveyer chain and provided with a pin 42 which projects inwardly in position to engage the tail piece 40 when the slide bar 41 is moved rearwardly to the position shown in Fig. 7. This will throw the pivoted flange 38 forwardly to engage the wrapper 35 and clamp it against the rear flange 36 of the preceding bucket. The slide bar 41 is operated by a bell crank 43 mounted on a stud shaft 44 and operated by a link 45, the lower end of which is pivoted to a lever 46 which is fulcrumed on a pivot shaft 47 and may be operated by any suitable means such as a cam on the shaft 6. A plate 48 is resiliently held by springs 49 on the end of an arm 50 which is pivoted on a stud shaft 51. The arm 50 is yieldingly connected by a spring 52 to an extension 53, the lower end of which is operated by a cam on the shaft 6. The movement of the pivoted flange 38 will carry the lower portion of the wrapper 35 against the plate 48 and will clamp the lower edge of the wrapper to the flange 36. After the operation of the flange 38, the arm 50 will be moved rearwardly to the position shown in Fig. 8. During this movement, the plate 48 will carry the wrapper 35 from the position shown in Fig. 7 to the position shown in Fig. 8, in which the wrapper will be spread upon the inner face of the conveyer bucket and bent into the corner formed at the lower front side of the flange 37. The arm 50 carries a wiper 54 pivoted at 55 which engages the top face of the wrapper 35 and presses it against the bottom of the bucket. An arm 56 is also provided with a plate 57 for positioning the wrapper in the bucket, the plate 57 being resiliently held on the end of the arm by a spring 58. After the movement of the arm 50 and while the plate 48 continues to hold the wrapper 35 in position in the corner of the bucket, the arm 56 will be swung rearwardly and downwardly to the position shown in Fig. 6. This will cause the plate 57 to engage the upwardly extending rear portion of the wrapper 35 and move the edge thereof into the pocket between the flanges 36 and 37. A retainer 59 is moved forwardly to engage the backwardly and downwardly folded portion of the wrapper 35 to assist in retaining it in its folded position about the top of the flange 37. The retainer 59 is carried by a pivoted link 60 and a link 61 rigid with a rock shaft 62', supported on the frame 31. The link 61 is oscillated by a crank 62 driven by the sprocket chain 34, the crank being connected by a connecting link 63, as shown in Fig. 1, to a lever 63' rigid with the rock shaft 62'. The arms 50 and 56 are then withdrawn from engagement with the wrapper 35 and returned to their original positions, as shown in Fig. 9. The conveyer chain is then moved forwardly one step and the retainer 59 is given a follow-up movement by the the link 61 so that the forward end of the retainer continues to hold the rear portion of the wrapper against the top edge of the flange 37, as shown in Fig. 9. This prevents any dislodgement of the wrapper during the withdrawal of the plates carried by the arms 50 and 56. During further forward movement of the conveyer chain, the wrapper remains in the position shown in Fig. 9. The parts remain in this position during several steps of the movement of the conveyer to permit the article to be wrapped to be placed by hand into the bucket on top of the wrapper. An article to be wrapped is illustrated at 64 in Fig. 9 of the drawings. All of the buckets will be supplied with such articles by an attendant during the time that the buckets are carried forwardly with the wrappers disposed in the position shown in Fig. 9.

A sealing station is provided for the wrappers at a point spaced in the direction of movement of the buckets from the station at which the wrappers are supplied to the buckets. As the buckets approach the sealing station, the pivoted flange 38 of each bucket is swung into upright position to fold the portion of the wrapper engaging the flange against the face of the article 64. The movement of the flange 38 is effected by an arm 65, shown in Figs. 10 and 23. The arm 65 is swung into contact with the tail piece 40 and moved upwardly from the position shown in Fig. 23 to the position shown in Fig. 10. The arm 65 is operated by a link 66 having its rear end pivoted to a lever 67 which is fulcrumed on the shaft 47 and operated by a cam on the shaft 6. The parts will be in the position shown in Fig. 10 when they enter the sealing station. The operations at the sealing station are illustrated in Figs. 12, 13, 14, 15, 16, 17 and 18. A pair of bell crank levers having arms 68, one at each side of the path of the conveyer, are carried on a shaft 69 and provided with inwardly extending pins 70. When the bucket moves into position at the sealing station, the arms 68 are in the position shown in Fig. 10. The first operation at the sealing station is an upward movement of the arms 68 which swings the rear flap of the wrapper upwardly from the position shown in Fig. 10 to the position shown in Fig. 12. The arms 68 are operated by a link 71 connected to a lever 72 which is pivoted on the shaft 47 and operated by a cam on the shaft 6.

After the arms 68 have lifted the rear flap of the wrapper to the position shown in Fig. 12, it is folded over the top of the article 64 by a plate 73 which is carried on an arm 74 pivoted at 75 on an arm 76. The arm 76 is secured to a rock shaft 77 pivotally mounted on a bracket 78 carried by the frame of the machine. A spring 79 urges the arm 74 against a pin 80 on the arm 76. The shaft 77 is oscillated by a link 81, the lower end of which is connected to a lever 82 pivoted on the shaft 47 and operated by a cam on the shaft 8. As the arm 76 is moved downwardly from the position shown in Fig. 12 to that shown in Fig. 14, the spring 79 will bring the forward edge of the plate 73 against the rear flap of the wrapper and further movement will fold the flap into the position shown in Fig. 15. A dependent stop 83 is interposed in the path of the upper edge of the wrapper flap to hold the top edge of the flap in an upright position, as shown in Fig. 15. The lower face of the plate 73 will bear upon the top of the article 64 and a plate 84 carried on the end of the arm 76 will engage the upper face of the plate 73 and extend rearwardly in an inclined direction therefrom. A shaft 85 is journaled in the bracket 78 and carries a plate 86 having a heating element 87 and a chiller 88 mounted thereon and resiliently pressed downwardly by springs 89. The shaft 85 is oscillated by a link 90 having its lower end secured to a lever 91 pivoted on the shaft 47 and operated by a cam on the shaft 8.

After the parts have been moved to the position shown in Fig. 15, the shaft 85 will be rotated in a clockwise direction to move the heater 87 against the front flap of the wrapper which folds the rear face of the front flap over the upper surface of the article 64 and causes the portion of the flap adjacent its edge to engage the upwardly bent portion of the rear flap, the inner faces of the two flaps being brought together and pressed between the lower surface of the heater 87 and the upper face of the plates 73 and 84 in the position indicated in Fig. 16. The arm 74 is provided with an adjustable stop 92 which bears against the flange 37, as shown in Figs. 15 and 16, to limit the movement of the plate 73. The arm 76 is still further rotated after the plate 73 is arrested, thus expanding the spring 79, as shown in Fig. 16. As the heater 87 passes over the contacting flaps, the wax on the flaps will be sufficiently melted to seal the flaps together and the passage of the chiller 88 immediately solidifies the melted wax to prevent separation of the sealed flaps. After the heater and chiller have passed over the flaps, the arm 76 will be reversed to withdraw the plate 84 from beneath the sealed flaps. The spring 79 will retain the plate 73 in position during the first part of the movement of the plate 84 to assist in stripping the sealed flaps from the surface of the plate 84. After the withdrawal of the plates 73 and 84, the conveyer will again move forwardly to carry the article with the wrapper sealed thereabout away from the sealing station and the plate 86 will be returned to its initial position as indicated in Figs. 17 and 18. The chiller 88, in its retracted position, contacts with a heat absorbing block 93 through which a cooling medium is circulated by means of conduits 94 and 95, as indicated in Fig. 21. In this way, the heat absorbed by the chiller 88 is conducted therefrom while the chiller is in its retracted position.

The article 64 is carried from the sealing station beneath a spring plate 96 which engages the upper face of the article and holds the sealed flaps together against the top surface of the article, as shown in Fig. 18.

Figure 2:
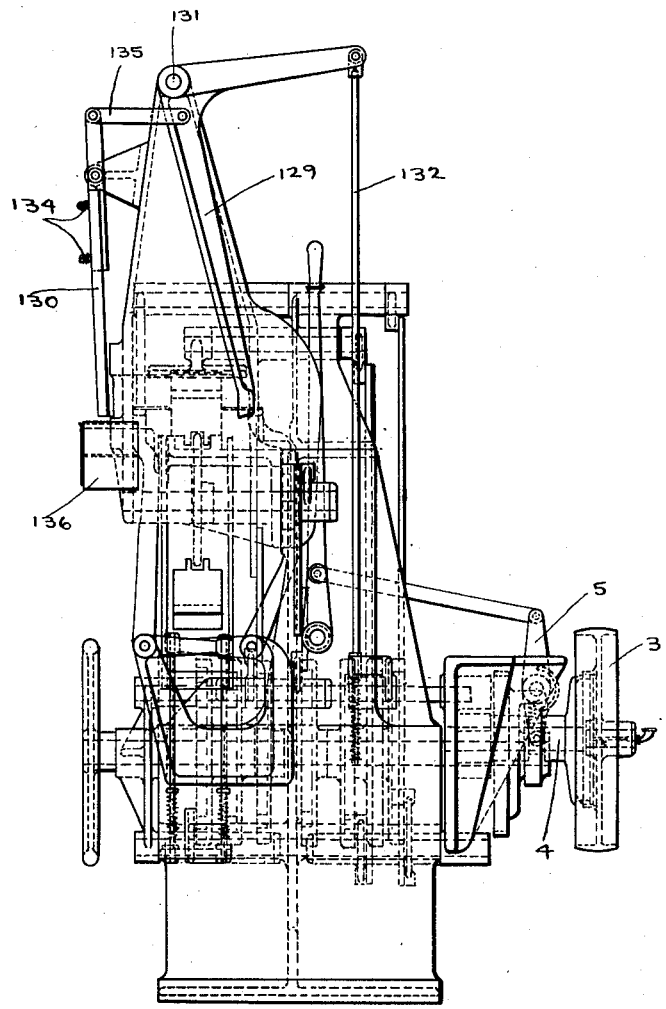
Fig. 2 is an end elevation of the machine shown in Fig. 1.
Figure 3:
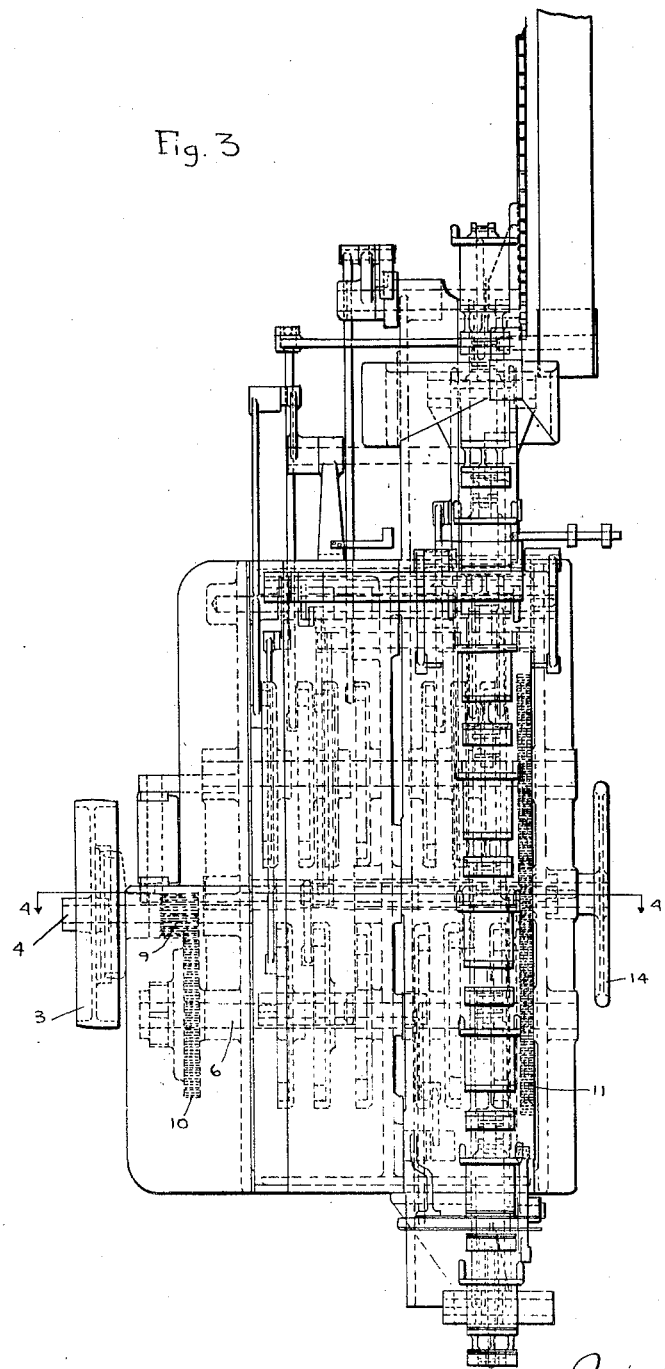
Fig. 3 is a top plan view.

The bucket with the article therein next comes to rest at the end folding station illustrated in Figs. 19, 20, 22, 24, 25, 26, 27, 28, 29, 30, 31, 32 and 33. When the article reaches the end folding station, the wrapper has already been sealed in tubular form about the article in the manner already explained with the ends of the wrapper projecting at each side of the conveyer. Registering with each of the projecting ends is a pair of spreader fingers 97. These fingers are pivoted on pins 98 supported on the ends of the reciprocating arms 99 and 100. The arms 99 and 100 are pivotally mounted at 101 and 102, respectively, to swing in and out toward and from the conveyer. The arms are operated by links 103 connected to levers 104 fulcrumed on the shaft 47 and operated by cams on the shaft 8. Pivoted on each of the arms 99 and 100 is a finger closing lever 105 having a spreader block 106 movable into and out of position between the outwardly projecting ends 107 of the fingers 97. The levers 105 are pivoted at 108 on their respective arms and have downwardly projecting tail pieces for engaging stops carried by horizontally disposed bars 109 and 110. Springs 111 operate to spread the inner ends of the fingers 97 when the fingers are released by the stop blocks 106. When the arms 99 and 100 are swung outwardly, the stop blocks 106 will be in the position shown in Fig. 25 to hold the inner ends of the fingers close together. When the arms 99 and 100 are swung inwardly, the inner ends of the fingers will first enter the projecting ends of the wrappers about midway of the vertical sides of the projecting portions. At this point, the tail pieces of the levers 105 will engage their respective stops so that the stop blocks 106 will be moved to the position shown in Fig. 26, freeing the fingers 97 and permitting them to separate so as to spread the projecting portion of the wrapper into the position shown in Figs. 22 and 26. Further inward movement of the arms 99 and 100 will carry the fingers 97 inwardly to the position shown in Figs. 24 and 27. This will fold the inner portions of the upper and lower sides of the projecting ends of the wrapper against the end of the article and bring the inner faces of the remaining projecting portions into close proximity to each other, forming a sealing flap, the sides of which may be sealed together to close the projecting ends of the tubular wrapper. This sealing flap extends away from the end of the article, as indicated at 112 in Figs. 27, 29 and 30. While the parts are in this position, upper and lower sealers 113 and 114 are moved across the ends of the article toward the sealing flap. Before the sealers reach the sealing flap, the spreader fingers are withdrawn so that the sealing flap may be clamped beneath the sealers and the inner faces heat sealed together. The upper sealer 113 is carried by an arm 115 pivoted at 116 and oscillated by a link 117, as shown in Fig. 20. The link 117 is pivoted at 118 to an arm 119 fulcrumed on the shaft 30 and oscillated by a cam on the shaft 8. The lower sealer 114 is carried on an arm 120 pivoted at 121 and operated by a link 122 connected to a rocker arm 123 which is secured to a stud shaft 124. The shaft 124 is oscillated by a link 125 pivoted at 126 to a lever 127, the lever 127 being fulcrumed on the shaft 30 and oscillated by a cam on the shaft 8. The sealers 113 and 114 may be electrically heated by means of supply wires 128 shown in Fig. 30. After the sealing flap 112 has been sealed in the manner illustrated in Fig. 30, the arm 115 is raised to relieve the pressure on the sealing flap and the arm 120 travels upwardly to cause the sealer 114 to follow the upward movement of the sealer 113. This brings the parts into the position illustrated in Figs. 31 and 32 and folds the sealing flap 112 upwardly against the ends of the article. After the sealing flap has been folded upwardly, the arm 120 will be lowered, as illustrated in Fig. 33. The article will then be completely sealed within the wrapper and the wrapper entirely folded about the article except for the projecting ends of the sealing flaps which may later be folded inwardly against the front and rear edges of the article. This inward folding is produced by a pair of arms 129 and 130, shown in Fig. 2. The arm 129 is in the form of a bell crank lever pivoted at 131 and having a link 132 extending downwardly and operated by a lever 133 pivoted on the shaft 30 and oscillated by a cam on the shaft 8. The arm 130 is provided with a spring 134 to permit yielding of the lower end of the arm to provide resilient pressure on the wrapped article. A link 135 connects the arm 130 to the arm 129 so that the two are caused to approach each other when the link 130 is operated and grip the article. Further movement of the link 132 carries the article laterally from its conveyer bucket and deposits it upon a conveyer belt 136 by means of which the wrapped article is discharged from the machine.

I claim:—

1. A wrapping machine comprising a conveyor having a pocket therein provided with a projection at one side thereof, a second projection spaced away from said first-named projection, means for positioning a wrapper in said pocket, and means for folding a portion of said wrapper to bring the edge thereof between said projections, said folded portion being retained between said projections after said wrapper has been positioned in said pocket.

2. In a wrapping machine, a holder for a wrapper having a supporting portion, two projections spaced from one another adjacent one side of said supporting portion, a third projection hinged to said supporting portion adjacent the opposite side thereof, means for positioning a wrapper on said supporting portion and for folding said wrapper about one of said projections to bring one edge thereof between said projections, and means for swinging said third projection inwardly to fold said wrapper against an article on said supporting portion.

3. In a wrapping machine, a conveyer chain having a series of spaced projections thereon forming pockets, the projection forming one side of each of said pockets being pivoted and movable into contact against the face of an adjacent projection to hold a portion of a wrapper between said projections.

4. In a wrapping machine, a conveyer having a plurality of buckets, each bucket having two projections adjacent one side thereof but spaced from each other, and a third projection pivoted adjacent the opposite side of said bucket, said pivoted projection being movable into position to engage a projection of the next adjacent bucket to grip a portion of a wrapper between said projections.

5. In a wrapping machine, a conveyer having buckets each provided with spaced projections adjacent one side thereof and a pivoted projection adjacent the opposite side thereof, means for positioning wrappers in said buckets, means for folding said wrappers about one of said spaced projections to bring the edge thereof between said spaced projections, and means for moving the pivoted projection into position to grip another portion of said wrapper between said pivoted projection and a projection of the next adjacent bucket.

6. In a wrapping machine, a conveyer having a plurality of buckets, each provided with spaced projections adjacent one side thereof and a pivoted projection adjacent the opposite side thereof, means for feeding a wrapper to said conveyer with one edge thereof interposed between said pivoted projection and a projection of the next adjacent bucket on said conveyer, means for moving said pivoted projection into position to grip the interposed portion of said wrapper, means for positioning said wrapper in said bucket with the portion thereof opposite that gripped by said pivoted projection folded over one of said spaced projections to bring the edge thereof between said spaced projections, and means for moving said bucket with the wrapper disposed therein into a position to receive an article to be wrapped.

7. In a wrapping machine, a conveyer having buckets thereon, each bucket having a fixed and a pivoted projection thereon forming a pocket, a third projection spaced from said projection, means for positioning a wrapper in said pocket with the opposite edges thereof folded over the edges of said fixed and pivoted projections respectively, means for moving said pivoted projection away from said pocket to grip said wrapper against a portion of the next adjacent bucket to hold said wrapper in position to receive an article, and means for returning said pivoted projection toward said pocket to fold said wrapper against an article in said pocket.

8. In a wrapping machine, a bucket having a fixed and a movable projection thereon forming a pocket, means for feeding a wrapper to said bucket, a member having a movable contact portion for engaging said wrapper and moving an intermediate portion thereof into said pocket, a projection on said bucket forming a recess at one side of said bucket, and a member having a yielding contact portion thereon for moving the edge portion of said wrapper into said recess.

9. A wrapping machine comprising a bucket having a movable projection at one side thereof, an intermediate projection co-operating with said movable projection to form a pocket, a third projection at the opposite end of said intermediate projection from said movable projection, means for depositing a wrapper on said bucket, yielding means for positioning said wrapper in said pocket while said movable projection is swung outwardly to an open position, yielding means for inserting an edge portion of said wrapper between said intermediate projection and the projection at the side thereof opposite said movable projection, means for moving said bucket, a follower for holding said wrapper in position in said pocket during the movement thereof, and means for swinging said movable projection inwardly to fold said wrapper against an article deposited in said pocket.

10. A wrapping machine comprising a support for an article, means for folding a wrapper about said article to bring the opposite edge portions together at one side of said article and for causing said edge portions to project away from said article to form sealing flaps, a sealing support arranged to be positioned at one side of said sealing flaps, means for pressing said sealing flaps against said support and for applying heat to said flaps, and a stripper for engaging and holding said flaps during the removal of said flap support.

11. A wrapping machine comprising a support for an article, means for folding a wrapper about said article to bring opposite edge portions of said article together with said edge portions projecting away from said article to form sealing flaps, a stripper, means for positioning said stripper adjacent said article at the base of said sealing flaps, a flap support positioned adacent said stripper, means for heat sealing said flaps together against said support, and means for removing said support while said stripper remains stationary.

12. In a wrapping machine, a support for an article, means for folding a wrapper about said article to cause opposite edge portions of said wrapper to project from one side of said article to form sealing flaps, a flap support, means for positioning said flap support adjacent said article at the side of one of said sealing flaps opposite from the other of said sealing flaps, a heat sealer, means for moving said heat sealer past said sealing flaps from the side thereof opposite said flap support while said flap support is interposed between said flaps and said article, said flap support comprising a pair of separable members, and means for moving the outermost one of said members away from said article while the other remains stationary.

13. In a wrapping machine, a support for an article to be wrapped, means for folding a wrapper about said article with opposite edge portions thereof projecting from said article to form sealing flaps, a flap support comprising a plate aranged to be positioned at one side of said article, a second plate disposed adjacent the outer face of said first-named plate and extending at an oblique angle therefrom, a sealer for folding said sealing flaps against said flap support to seal adjacent faces of said flaps together, and means for retracting said second-named plate in advance of said first-named plate.

14. In a wrapping machine, a support for an article, means for folding a wrapper about said article with opposite edge portions thereof projecting from said article to form sealing flaps, a flap support movable into position adjacent said article, said support comprising separate plates, one of which is yieldingly held in a predetermined position relative to the other, a stop for limiting the movement of said yieldingly held plate toward said article, a heat sealer for pressing said flaps against said flap support to seal adjacent faces of said flaps together, and means for retracting said plates, said yieldingly held plate being arranged to remain stationary in the position determined by said stop during the first portion of the retractive movement of the other of said plates.

15. In a wrapping machine, a support for an article to be wrapped, means for folding a wrapper about said article to cause opposite edge portions thereof to project from said article at the same side thereof to form sealing flaps, a flap supporting plate, a stripper plate, pivotally connected arms for supporting said plates, respectively, a stop for limiting the relative movement of said plates in one direction, a spring for moving said stripper plate toward said article, a stop for limiting the movement of said stripper plate toward said article, means for moving said flap supporting plate into engagement with said stripper plate while said stripper plate is in contact with said article, heat sealing means for pressing said flaps into contact with each other against said flap supporting plate, and means for retracting said flap supporting plate while said stripper plate remains in contact with said article.

16. In a wrapping machine, means for folding a wrapper to form a tube with opposite edge portions of said wrapper having their inner faces contacting with each other outside of said tube, means for heat sealing together said contacting faces, means for spreading the ends of said tube to bring the inner faces thereof together, and means for heat sealing said faces together to form sealing flaps at the ends of said tube.

17. In a wrapping machine, means for folding a wrapper about an article to form a tube with the ends of said tube projecting beyond said article and with the inner faces of the edge portions of said wrapper contacting with each other outside of said tube, means for heat sealing together said contacting edge portions, means for spreading the ends of said tube to bring the inner faces thereof together, means for heat sealing the inner faces of said tube at each end of said tube to form a sealing flap, and means for folding the projecting ends of said tube against said article.

18. In a wrapping machine, means for folding a wrapper about an article with a portion of said wrapper projecting at one side of said article, a spreader for engaging the inside of said projecting portion, and means for moving said spreader toward said article to fold the projecting portion of said wrapper against said article.

19. In a wrapping machine, means for folding a wrapper about an article with a portion thereof projecting at one side of said article, a pair of spreader fingers, means for inserting said fingers in the projecting portion of said wrapper and for separating said fingers to spread said portion, and means for sealing together the spread portion of said wrapper.

20. In a wrapping machine, means for sealing an open end of a wrapper comprising a pair of spreader fingers, means for inserting said fingers in the open end of said wrapper, means for separating said fingers while inserted in said wrapper to spread the end of said wrapper, and means for sealing the spread end of said wrapper.

21. Mechanism for closing the open end of a wrapper comprising a spreader, means for inserting said spreader into said open end to spread said end and bring opposite portions thereof toward each other, and means for moving said spreader toward said wrapper to fold the portion of said wrapper adjacent that engaged by said spreader.

22. Means for closing the open end of a wrapper having material therein comprising a pair of spreader fingers, means for inserting said fingers in the open end of said wrapper, means for separating said fingers to spread said wrapper, means for moving said fingers toward the material in said wrapper to fold said wrapper against said material, and means for sealing together the spread portion of said wrapper.

23. In a wrapping machine, means for folding a wrapper about an article with a portion of said wrapper projecting at one side of said article, a spreader for said projecting portion, means for inserting said spreader into the projecting portion of said wrapper to spread said portion and bring opposite sides thereof together, means for sealing together said opposite sides to form a sealed flap, and means for folding said flap against said article within said wrapper.

24. In a wrapping machine, means for folding a wrapper about an article with an open portion of said wrapper projecting from said article, a spreader, means for inserting said spreader into said open portion, and for expanding said spreader to engage the interior of said open portion and collapse said portion, and means for heat sealing said collapsed portion while said portion projects away from said article.

25. In a wrapping machine, means for folding a wrapper about an article with a portion of said wrapper projecting at one side of said article, a spreader, means for inserting said spreader with the projecting portion of said wrapper and for expanding said spreader to collapse the projecting portion of said wrapper, means for heat sealing the collapsed portion of said wrapper while extending away from said article, and means for folding the sealed portion of said wrapper against said article.

26. In a wraping machine, means for folding a wrapper about an article with a portion of said wrapper projecting at one side of said article, a pair of sealers, means for moving said sealers into engagement with opposite sides of said projecting portion to seal the inner faces of said portions together, and means for moving one of said sealers transversely of said projecting portion to fold said portion against said article.

27. In a wrapping machine, means for spreading the open end of a tubular wrapper, a pair of sealers for engaging opposite sides of the spread portion of said tubular end to seal the inner faces of said spread portion together, and means for moving one of said sealers transversely of the sealed portion of said wrapper to fold said sealed portion.

28. In a wrapping machine, means for forming a tubular wrapper about an article with an open end thereof projecting from said article, a spreader, means for inserting said spreader in said tubular end and for expanding said spreader to collapse said tubular end, a pair of sealers, means for moving said sealers toward each other to grip the collapsed portion of said tubular end and seal the inner faces thereof together, and means for moving said sealers transversely of said sealed portion to fold said sealed portion against said article.

29. In a wrapping machine, means for forming a tubular wrapper about an article with the end thereof projecting from said article, a spreader, means for inserting said spreader part-way toward said article in said tubular end and for expanding said spreader to engage the inside of said tubular end and collapse said end, said inserting means operating to move said spreader toward said article after the spreading operation thereof to fold said wrapper against said article, and a pair of sealers for engaging opposite faces of the spread end of said tubular wrapper while said spread end projects from said article to seal said faces together.

30. In a wrapping machine, means for folding a wrapper about an article, providing an open tubular end projecting from said article, a spreader movable into the open end of said wrapper, means for expanding said spreader in said open end to collapse said end and form a sealing flap, means for engaging opposite faces of said sealing flap to cause the inner faces thereof to adhere to each other, said engaging means being movable transversely of said sealing flap to fold said flap against said article.

31. In a wrapping machine, means for folding a wrapper about an article with a portion of said wrapper projecting from said article to form an open tubular end, a pair of spreader fingers, means for inserting said fingers in said open end, means for separating said fingers when inserted part-way in said open end to engage the inside of said wrapper and fold said wrapper against said article during further movement of said fingers toward said article, and means for engaging opposite portions of the spread end of said wrapper to seal said end.

32. In a wrapping machine, means for folding a wrapper about an article with a portion thereof projecting from said article to provide an open tubular end, a pair of spreader fingers, means for inserting said fingers in the open end of said wrapper, means for separating said fingers when properly inserted in said wrapper to cause said fingers to engage the inside of said wrapper to collapse the end thereof and fold said end against said article during further movement of said fingers, a pair of sealing members arranged to engage opposite portions of said spread end to seal the inner faces thereof together, means for withdrawing one of said sealing members, and means for moving the other of said sealing members transversely of the sealed end of said wrapper to fold said sealed end against said article.

33. In a wrapping machine, means for supporting material in a wrapper, means for heat sealing a wrapper around the material to form a package, a chiller movable to engage the sealed portion of the wrapper for chilling the same, means for holding said package stationary during the chilling operation of said chiller, said chiller being movable into withdrawn position out of engagement with the wrapper, and a heat conductor disposed in position to engage said chiller when said chiller is withdrawn from engagement with said wrapper.

34. In a wrapping machine, means for supporting material in a wrapper, a heater movable to engage said wrapper and heat seal the same around the material to form a package, a chiller movable to engage the sealed portion of the wrapper after the heating movement of said heater, means for holding said package stationary during the movement of said heater and chiller, said chiller being movable into withdrawn position out of engagement with the wrapper, and a heat conductor disposed in position to engage said chiller when said chiller is withdrawn from engagement with said wrapper.

35. In a wrapping machine, means for supporting material in a wrapper, means for heat sealing a wrapper around the material to form a package, an arm, means for rocking said arm into a forward and rearward position, a chiller on said arm for engaging the sealed portion of the wrapper during the forward movement of said arm, means for holding said package stationary during the forward movement of said arm, and a heat conductor disposed in the path of movement of said chiller to contact with said chiller when said arm is moved rearwardly.

36. In a wrapping machine, means for supporting material in a wrapper, an arm, means for rocking said arm into a forward and rearward position, a heater on said arm to engage said wrapper and heat seal the same around the material to form a package when said arm is moved forwardly, a chiller on said arm rearward of said heater for engaging the sealed portion of the wrapper during the forward movement of said arm, means for holding said package stationary during the forward movement of said arm, and a heat conductor disposed in the path of said chiller to contact with said chiller when said arm is moved rearwardly.

37. In a wrapping machine, a bucket having a pocket therein, means for feeding a wrapper to said bucket, means for gripping one edge of said wrapper, and an arm having a spring-held contact thereon for moving an intermediate portion of said wrapper into said pocket.

In testimony whereof I have signed my name to this specification on this 23d day of February, A. D. 1927.

MICHAEL J. MILMOE.